United States Patent
Lorusso

(10) Patent No.: US 11,673,335 B2
(45) Date of Patent: Jun. 13, 2023

(54) CALIBRATION SYSTEM FOR AUTOMATICALLY RESETTING THE EFFECTIVE VERTICAL Z COORDINATE CORRESPONDING TO THE TIP OF A 3D PRINTER EXTRUDER

(71) Applicant: ROBOZE S.P.A., Bari (IT)

(72) Inventor: Alessio Lorusso, Bari (IT)

(73) Assignee: ROBOZE S.P.A., Bari (IT)

( * ) Notice: Subject to any disclaimer, the term of this patent is extended or adjusted under 35 U.S.C. 154(b) by 113 days.

(21) Appl. No.: 17/088,260

(22) Filed: Nov. 3, 2020

(65) Prior Publication Data

US 2021/0129444 A1 May 6, 2021

(30) Foreign Application Priority Data

Nov. 4, 2019 (IT) .................. 102019000020272

(51) Int. Cl.
*B29C 64/393* (2017.01)
*B33Y 50/02* (2015.01)
(Continued)

(52) U.S. Cl.
CPC .......... *B29C 64/393* (2017.08); *B29C 64/118* (2017.08); *B29C 64/209* (2017.08); *B29C 64/232* (2017.08); *B29C 64/236* (2017.08); *B29C 64/25* (2017.08); *B33Y 50/02* (2014.12); *B33Y 30/00* (2014.12)

(58) Field of Classification Search
CPC ... B29C 64/393; B29C 64/118; B29C 64/209; B29C 64/232; B29C 64/236; B29C 64/25
See application file for complete search history.

(56) References Cited

U.S. PATENT DOCUMENTS

2010/0100224 A1    4/2010 Comb et al.
2015/0217519 A1*   8/2015 Otten .................... B29C 64/106
                                                              425/150
(Continued)

FOREIGN PATENT DOCUMENTS

CN         86 1 05617        3/1988

OTHER PUBLICATIONS

Search Report for IT 2019000020272 dated Jul. 1, 2020, 2 pages.

*Primary Examiner* — Joseph S Del Sole
*Assistant Examiner* — Mohamed K Ahmed Ali
(74) *Attorney, Agent, or Firm* — Nixon & Vanderhye

(57) ABSTRACT

A calibration system for automatically resetting the effective vertical Z coordinate corresponding to the tip of an extruder of a printing head with filler material filament for 3D printers provided with a printing plane movable along the vertical Z axis, wherein the printing head is installed on a carriage for moving the extruder on the horizontal plane XY, includes at least one touch probe unit associated with and operatively connected to the extruder, specifically arranged between the carriage and the extruder itself, including: at least one movable support, at least one touch probe, at least one extruder support, at least one coupling system, at least one carriage, at least one extruder. The movable support is substantially a mechanical spring-operated sliding system, configured to allow the extruder to travel the path needed to activate the touch probe during the touching operation and to return to the printing position.

17 Claims, 10 Drawing Sheets

(51) Int. Cl.
 *B29C 64/118* (2017.01)
 *B29C 64/232* (2017.01)
 *B29C 64/209* (2017.01)
 *B29C 64/236* (2017.01)
 *B29C 64/25* (2017.01)
 *B33Y 30/00* (2015.01)

(56) References Cited

U.S. PATENT DOCUMENTS

| | | |
|---|---|---|
| 2015/0343688 A1 | 12/2015 | Goodman et al. |
| 2020/0061911 A1* | 2/2020 | Kettelarij ............... B29C 64/209 |
| 2020/0198234 A1* | 6/2020 | Kuster .................. B29C 64/393 |

* cited by examiner

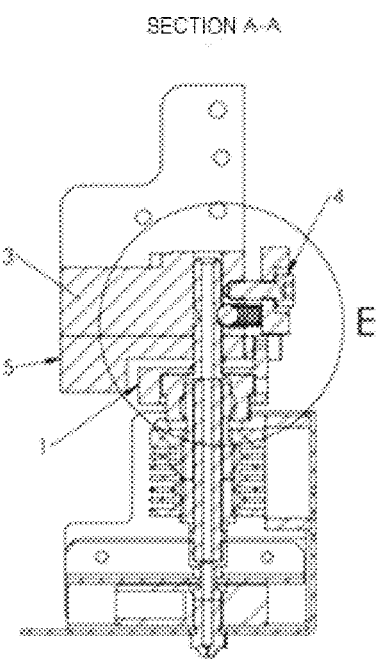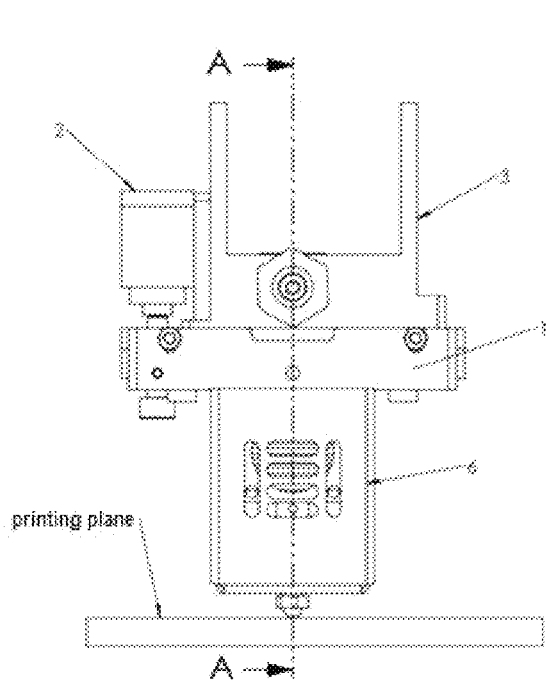
FIG. 2A      FIG. 2B
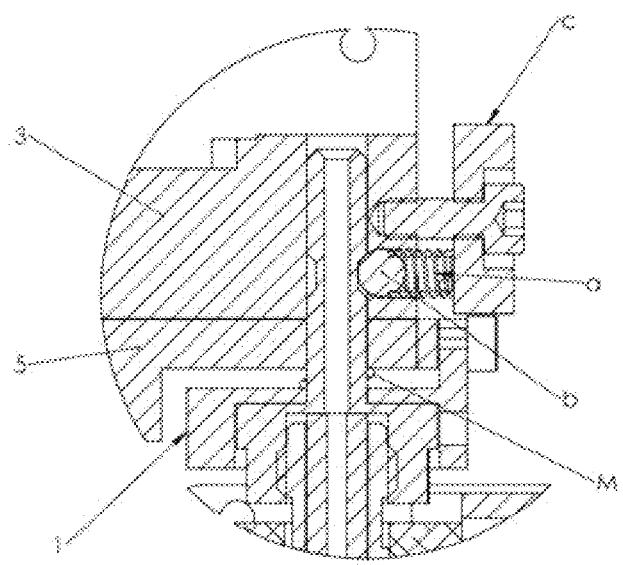
DETAIL E
SCALE 2:1
FIG. 2C

DETAIL A

CALIBRATION SYSTEM FOR AUTOMATICALLY RESETTING THE EFFECTIVE VERTICAL Z COORDINATE CORRESPONDING TO THE TIP OF A 3D PRINTER EXTRUDER

CROSS-REFERENCE TO RELATED APPLICATIONS

This application is claims priority to IT 102019000020272 filed Nov. 4, 2019, the entire contents of each of which are hereby incorporated by reference.

BACKGROUND OF THE INVENTION

In the field of professional or industrial precision 3D printers, having the certainty of the effective position of the extruder tip is very important.

If the position of the extruder on the XY horizontal plane is determinable through an initial setting when the printer is built, the position along the vertical Z axis of the extruder tip may change instead over time due to several factors, including nozzle wear and incorrect mounting height of the extruder.

SUMMARY OF THE INVENTION

It is the main object of the present invention to solve this problem by means of a system which allows finding the "extruder zero", i.e. finding the absolute coordinate along the Z axis corresponding to the extruder tip, without the need to control the leveling of the nozzle with the plane, as occurs in the current 3D printing systems, also allowing the replacement of the manually adjustable movable printing plane with screw systems with other rigid or semi-rigid printing planes.

This is achieved, according to the invention, by providing an automatic resetting system of the effective vertical Z coordinate corresponding to the tip of an extruder comprising a touch probe unit associated with and operationally connected to the extruder, specifically arranged between the carriage for moving the extruder on the XY plane and the extruder itself.

The resetting system is advantageously applicable to 3D printers with 1, 2, 3, or more screws for the movement along the Z axis.

A better understanding of the invention will be achieved by means of the following detailed description and with reference to the accompanying figures, which show a preferred embodiment and a variant thereof by way of non-limiting example.

BRIEF DESCRIPTION OF THE DRAWINGS

In the drawings:

FIG. 1B also shows—with dotted line—two side guides, which could also be arranged at the front;

FIGS. 2A, 2B, 2C are a front view, a section view taken along a plotting plane A-A (in FIG. 2A), and an enlarged detail "E", corresponding to FIG. 1A, respectively;

DESCRIPTION OF THE PREFERRED EMBODIMENTS

Figure 1A:
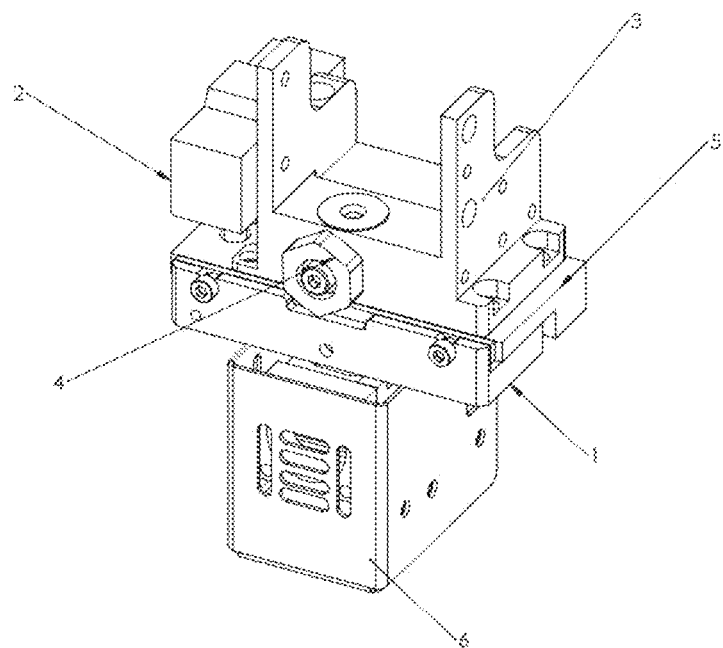
FIGS. 1A and 1B both show a 3D view of a preferred embodiment of the invention, if a single extruder is provided in the printing head.
Figure 1B:
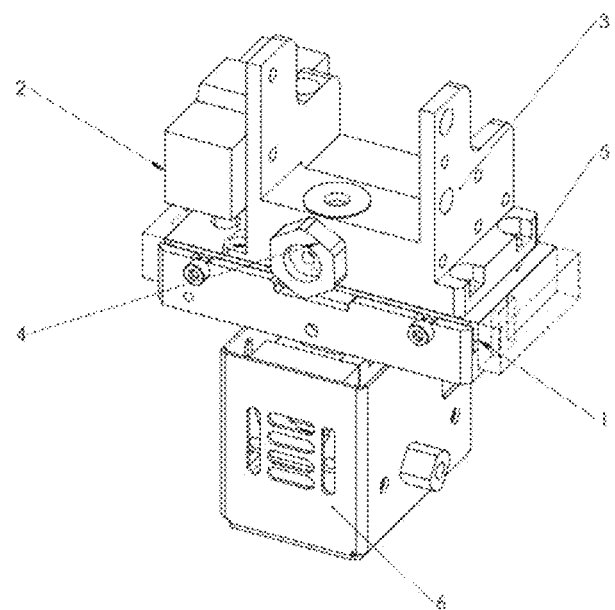

According to the present invention, the automatic resetting system of the effective vertical Z coordinate corresponding to the tip of an extruder of a 3D printer comprises:

a movable support (1)
a touch probe (2)
an extruder support (3)
a coupling system (4), preferably quick coupling
a carriage (5)
an extruder (6).

The movable support (1) is substantially a mechanical spring-operated sliding system, preferably very rigid, which allows the extruder to travel the path needed to activate the touch probe (2) during the probing operation and to return to the printing position.

Such a movable support (1) is provided with elastic means, such as springs (M), which cooperate with precision linear guides, which may be of various type, wherein the latter are configured to ensure that the nozzle to travel the working path to activate the circuit of the touch probe (2) allowing the movement only along Z with centesimal accuracy. In the example, said springs (M) are described mounted between the movable support (1) and the extruder support (3) to push the extruder towards the printing position.

An element is rigidly connected to such a movable support (1), having position adjustment means to actuate the touch probe without interfering with the carriage (5) or the support (1).

The touch probe (2) is preferably of the electro-mechanical type, to switch the actuation movement into an input for a controller, which is preferably, but not exclusively, a microcontroller unit (MCU) integrated on a single electronic circuit, or a common PLC.

The extruder support (3) is preferably made of metal, such as aluminum, and is provided with coupling means (4) of the extruder (6), preferably of the quick coupling type.

The quick-coupling means (4) of the extruder (6) referred to the embodiment shown in FIGS. 1A, 1B, 2A, 2B and 2C, include a push spring (a) and a ball (b) preferably made of steel, wherein the spring is held in compression by an adjustable knob (c), which allows modifying the elastic force applied by the spring (a) onto the ball (b). In particular, the body of the extruder (6) is axially insertable into its housing and is provided with an appropriate recess for said ball (b) placed at a fixing stretch, while the ball (b) is movable in transversal direction to the body of the extruder (6), so as to enter partially into said recess to snap-lock the body of the extruder in the axial direction, precisely at the aforesaid fixing stretch.

By locking the knob (c), the removal of the extruder (6) is inhibited, leaving it however free to move in the axial probing direction along the Z axis, the extent of which is at least equal to the working path for activating the touch probe (2); for such a purpose, the recess present in the body of the extruder (6) is larger than the ball, at least along the sliding axis of the extruder itself.

The carriage (5) is a moving part along the XY plane of the 3D printer, on which the components described above, which also forming the printing head, are installed.

The extruder (6), used in additive manufacturing systems (such as a 3D printer), is the element of the machine which allows the passage of the state of the filament from solid to viscoelastic, allowing the deposition by layers of the material.

According to a particular feature of the present invention, the tip of the nozzle of the extruder (6) is the element responsible for making physical contact with the printing plane of the 3D printer, to obtain the reading/detection of the Z=0 coordinate of the plane itself by actuating the touch probe (2).

In other words, to detect the actual position of the Z=0 coordinate of the printing plane, the latter is lifted until it comes into physical contact with the tip of the extruder (6), which, by moving imperceptibly upwards, actuates the touch probe (2) to signal the achieved contact.

Hereafter, we will describe an example of how the automatic resetting procedure is performed to identify the effective vertical Z coordinate corresponding to the tip of the extruder in detail.

Figure 6:
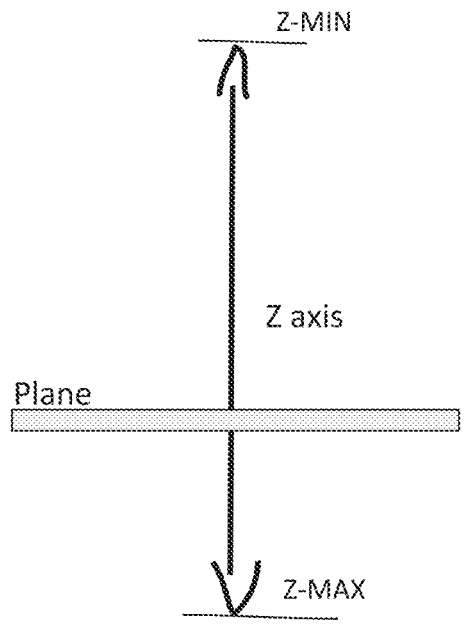
FIG. 6 is a schematic diagram showing the movement of a printing plane of a 3D printer along the Z axis between a maximum point and a minimum point.

As already mentioned, the printing plane of a 3D printer is a plane which is vertically movable along the Z axis, both upwards and downwards, starting from the maximum point (Z-MAX), i.e. the furthest point from the extruder reachable by the printing plane, to the minimum point (Z-MIN) reachable from the printing plane, i.e. the point which can go beyond the zero of the extruder (i.e. above the extruder tip). See FIG. 6.

Figure 7:
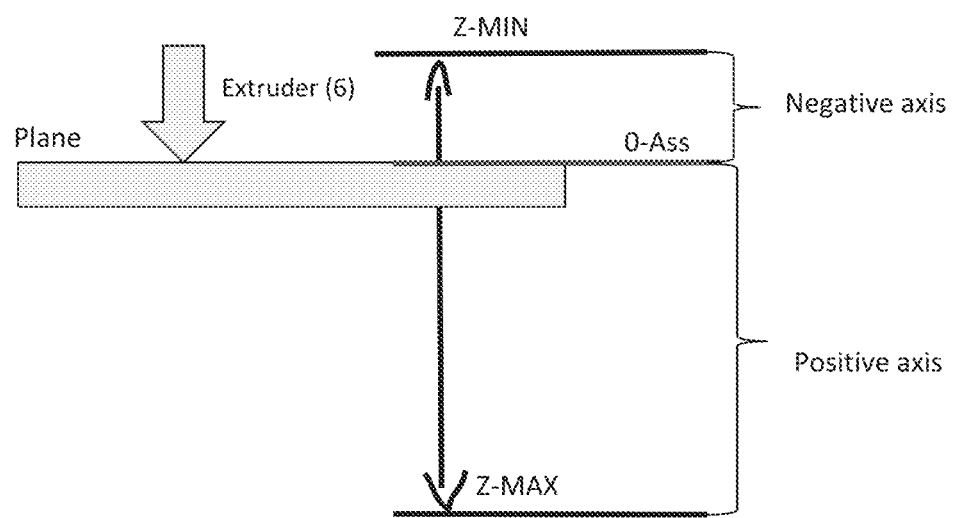
FIG. 7 is a schematic diagram showing the positioning of the absolute zero along the Z axis (i.e. the absolute coordinate in which a surface of a printing table "skims" an extruder tip)

The absolute zero (0-Ass) corresponds to the absolute coordinate along the Z axis in which the surface of the printing table "skims" (maximum error of +0.015 mm) the extruder tip (6). See FIG. 7.

Figure 8:
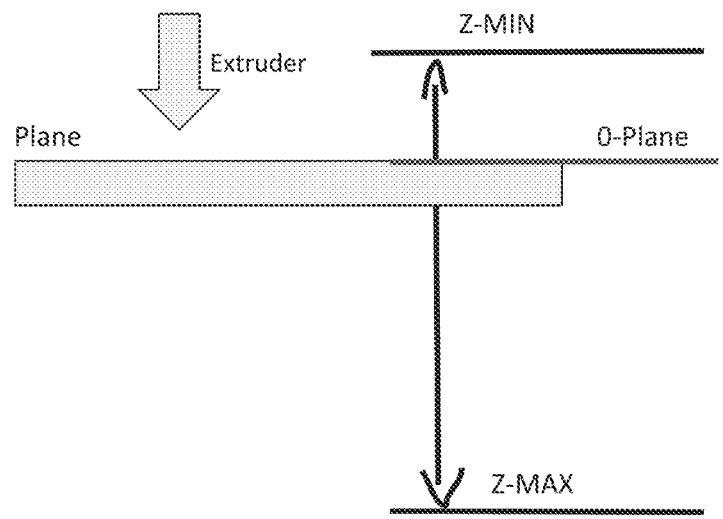
FIG. 8 is a schematic diagram showing the positioning of the zero plane, corresponding to the absolute coordinate of a printing plane surface, along the Z axis.

The zero plane (0-Plane) corresponds to the absolute coordinate of the printing plane surface; it is worth noting that this coordinate is always known and is the coordinate which is defined on the machine along the Z axis. See FIG. 8.

Figure 9:
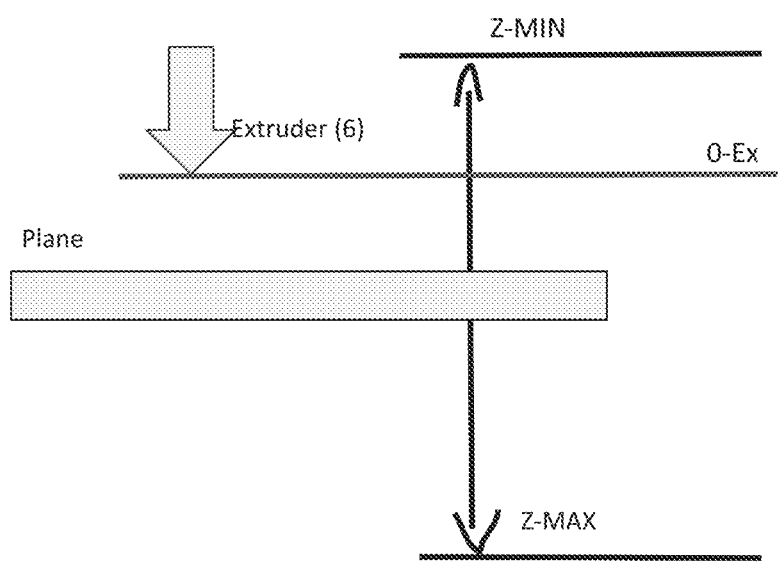
FIG. 9 is a schematic diagram showing the absolute coordinate along the Z axis of the extruder tip (extruder zero)

The extruder zero (0-Ex) corresponds to the absolute coordinate along the Z axis of the extruder tip. See FIG. 9.

The resetting calibration of the extruder (6) is the procedure which, at least in a single calibration point of the plane, moves the printing plane along the vertical Z axis to make the 0-Plane (which is specific to the calibration point) to correspond to 0-Ex and, therefore, to the 0-Abs.

Figure 10:
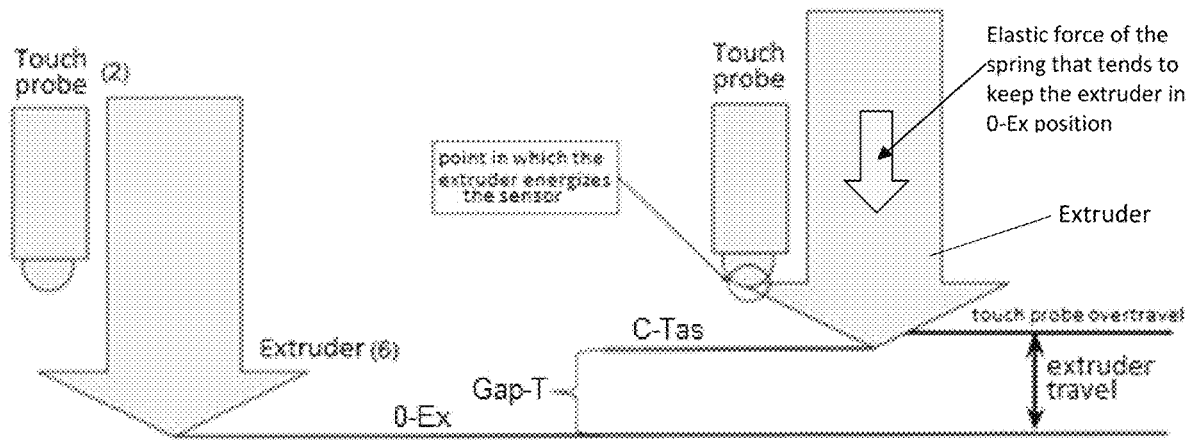
FIG. 10 is a schematic diagram showing a calibration system according to the invention.

From an operational point of view, the touch probe (2) is mounted on the extruder support (3) integrally therewith. Such a probe (2) requires a physical displacement of the extruder (6)—by a distance known and indicated by Gap-T in the figures—which is sufficient to actuate the touch probe itself so that the latter can send the signal to the aforesaid central control unit (MCU or PLC) which manages the entire machine. Such a control unit is preferably integrated in the 3D printer but could also be separate from and in constant operational connection with it. See FIG. 10.

Any points of the plane can be probed.

When the extruder is mounted in or removed from its housing, since the latter does not have a fixed vertical dimension or reference abutment, the absolute 0-Ex coordinate of the extruder tip on the absolute Z axis is unknown. The purpose of extruder calibration (6) is to find this coordinate and set it as 0-Plane to obtain the 0-Ass.

A similar problem occurs if the extruder (6) has not been removed but its tip (i.e. the end of the nozzle) is subject to wear during normal use.

Figure 11A:
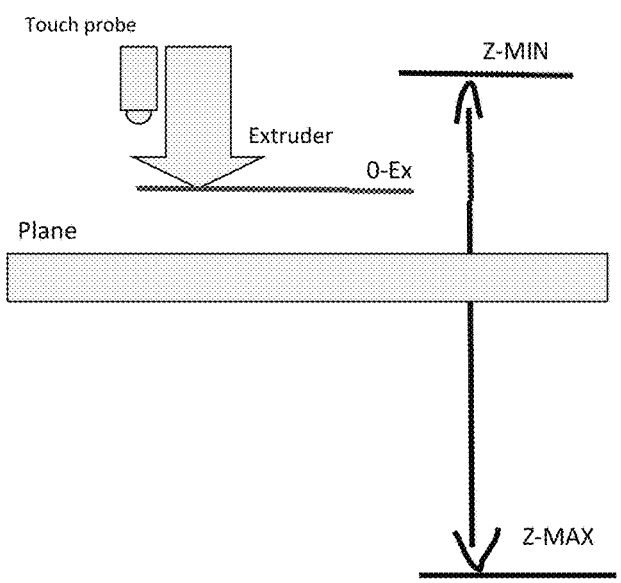
FIGS. 11A to 11D show subsequent steps of a measurement procedure by using the system od the present invention.
Figure 11B:
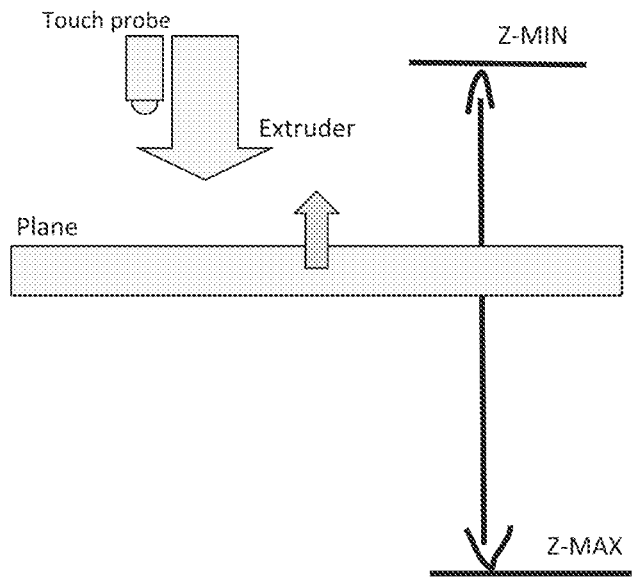
Figure 11C:
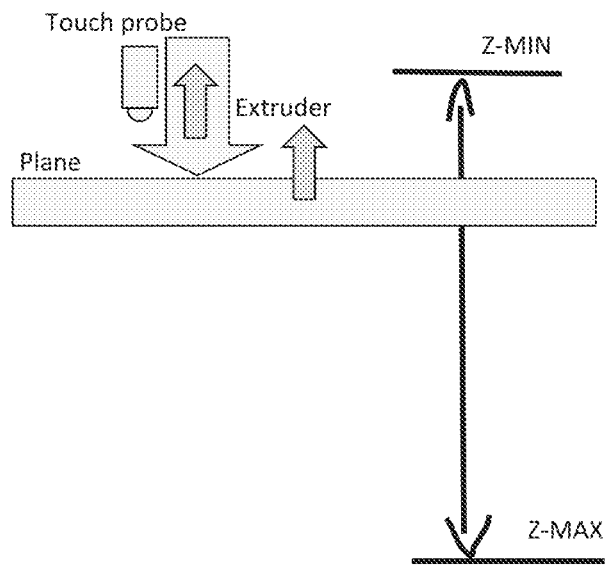
Figure 11D:
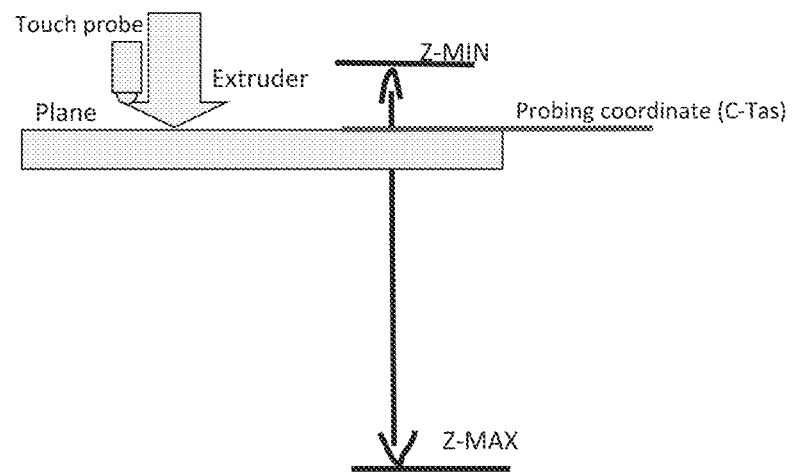

How the measurement is performed:

1) Resting condition (FIG. 11A)
2) The printing plane starts to move up towards the extruder (6) moving along the Z-axis (FIG. 11B)
3) The plane touches the tip (the lower end of the nozzle) of the extruder (6), moving the extruder slightly upwards overcoming the elastic force of the spring (M). See FIG. 11C.
4) The extruder (6), by moving upwards, actuates the touch probe (29) which sends a signal to the controller, which determines the immediate stopping of the vertical movement of the plane, as well as the storage of the coordinate (Z) of the touch probe (C-Tas). See FIG. 11D.

The upward displacement (Gap-T) of the extruder (6) needed to operate the touch probe (2) is known, so the 0-Ex coordinate can be found with the following formula:

$$0\text{-Ex}=C\text{-Tas}+\text{Gap-T}$$

Figure 12:
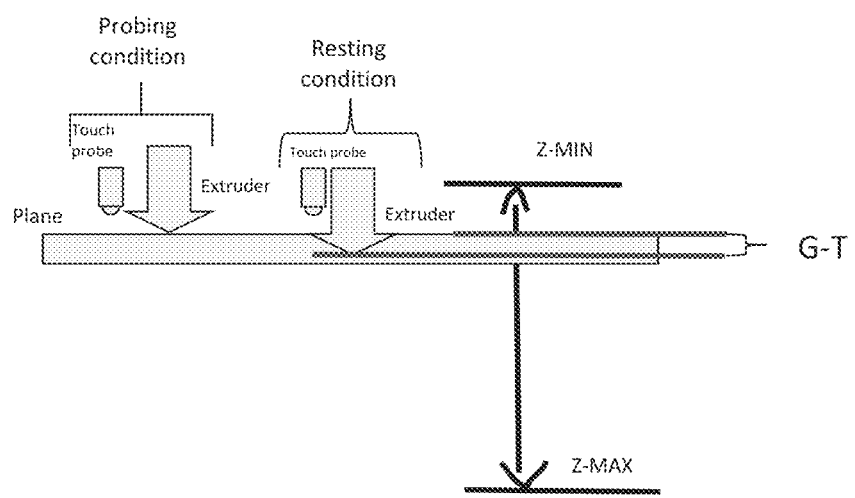
FIG. 12 a schematic diagram showing the positioning of touch probe and extruder with respect to the printing plane of the 3D printer under a probing condition and a resting condition, respectively.

FIG. 12 schematically shows the positioning of the touch probe (2) and the extruder (6) with respect to the printing plane under a probing condition and a resting condition, respectively.

Figure 3A:
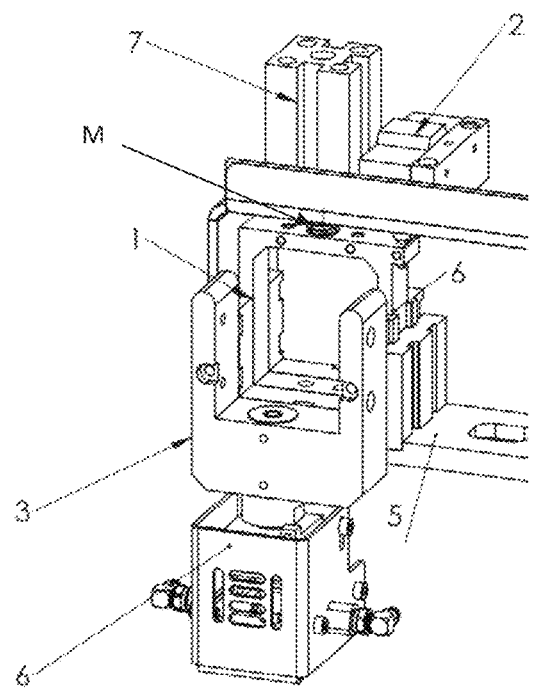
FIGS. 3A and 3B, respectively similar to FIGS. 1A and 2A, show a first variant of the invention.
Figure 3B:
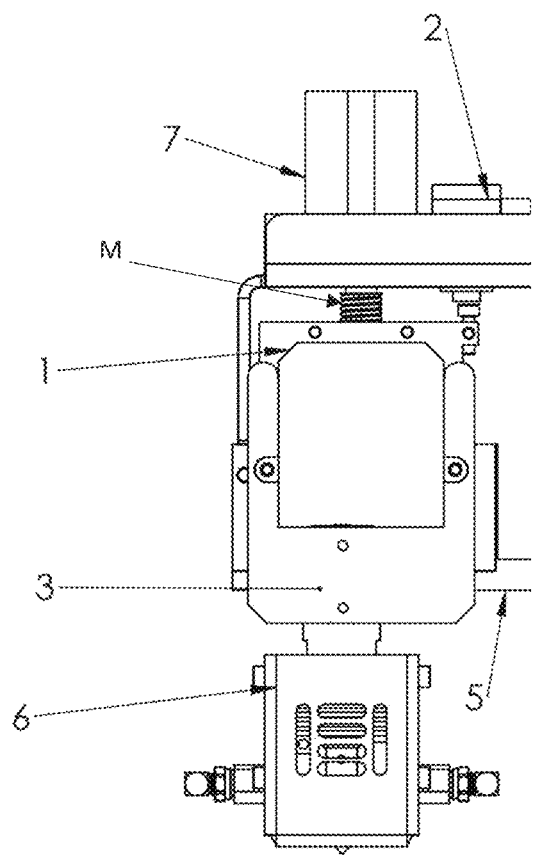

A first variant of the invention, shown in FIGS. 3A-3B, includes an additional locking mechanism (7), preferably pneumatic or electromechanical, adapted to lock, during the printing operation, the sliding of the movable support (1) with respect to the extruder support (3), to prevent possible undesired/uncontrolled translations of the extruder (6) along the Z axis with respect to the carriage (5) with which the extruder support (3) is integral which could compromise the printing quality. It is hardly necessary to note that, during extruder calibration (6), this locking mechanism (7) must be disabled to perform the probing functions described above.

In such a first variant, the quick coupling system is preferably missing.

Figure 5A:
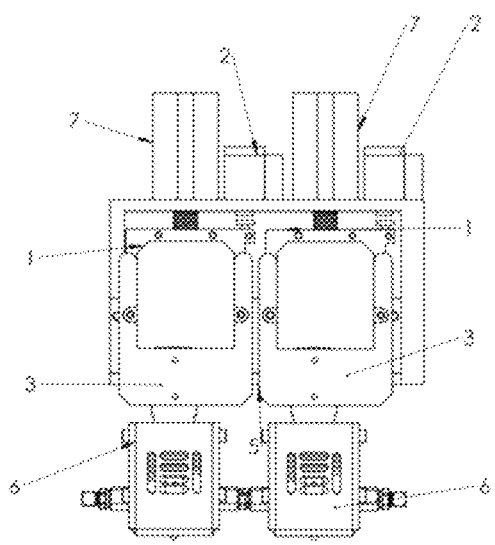
FIGS. 5A, 5B, 5C are relative to the first variant, if more than one extruder with respective touch probes are provided in the printing head.
Figure 5B:
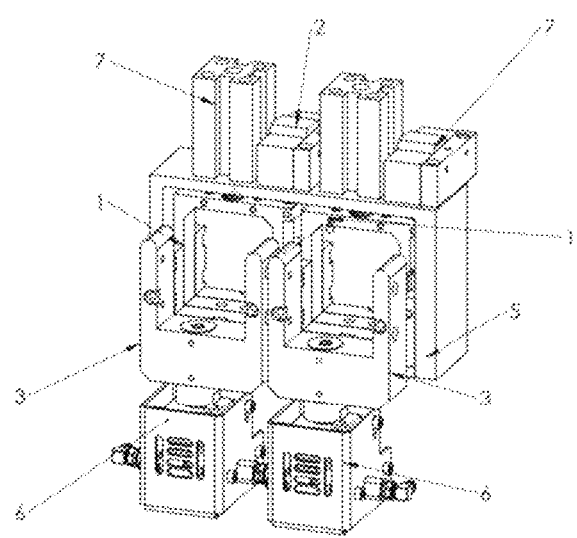
Figure 5C:
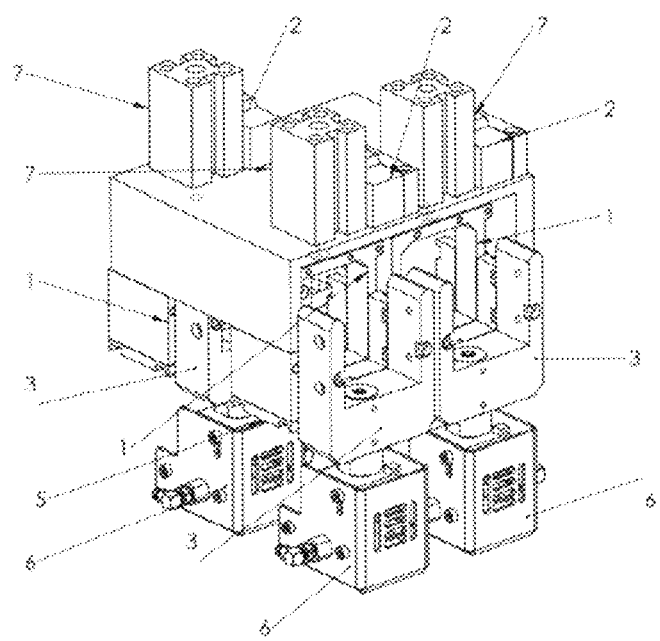

It is interesting to note that if more than one extruder (6) with respective touch probes (2) are provided, as shown in FIGS. 5A-5B-5C, only the locking mechanism (7) of the extruder to be calibrated must be unlocked at calibration, while the other extruders must be temporarily taken to a higher Z position relative to the one for the probing. In this case, to perform the respective calibrations, the movable support (1), the extruder support (3) and the locking mechanism (7) are replicable for each extruder (6) mounted on the carriage (5).

Figure 4A:
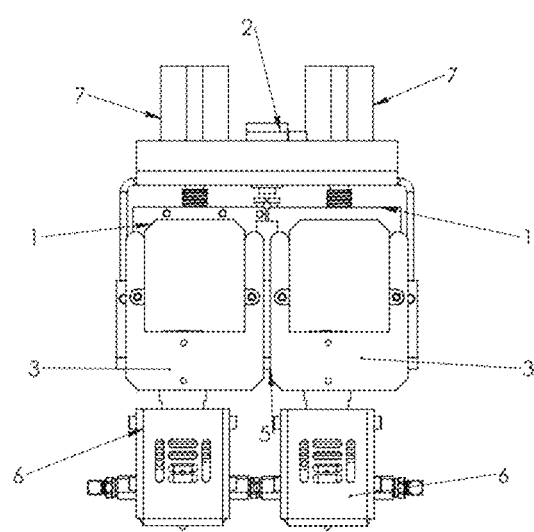
FIGS. 4A, 4B, 4C show a second variant of the invention, in which several extruders which use one and the same touch probe are provided in the printing head.
Figure 4B:
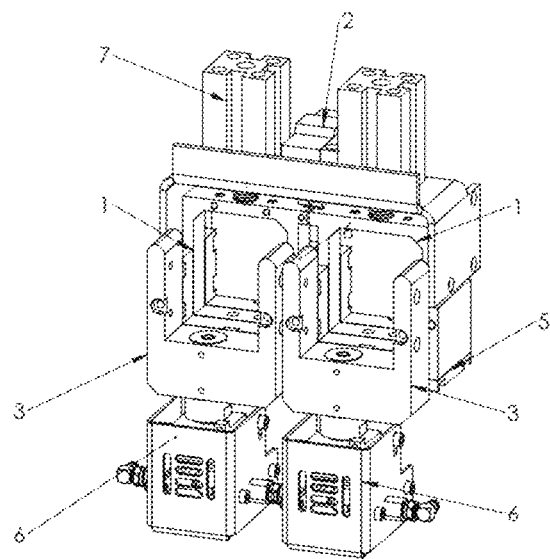
Figure 4C:
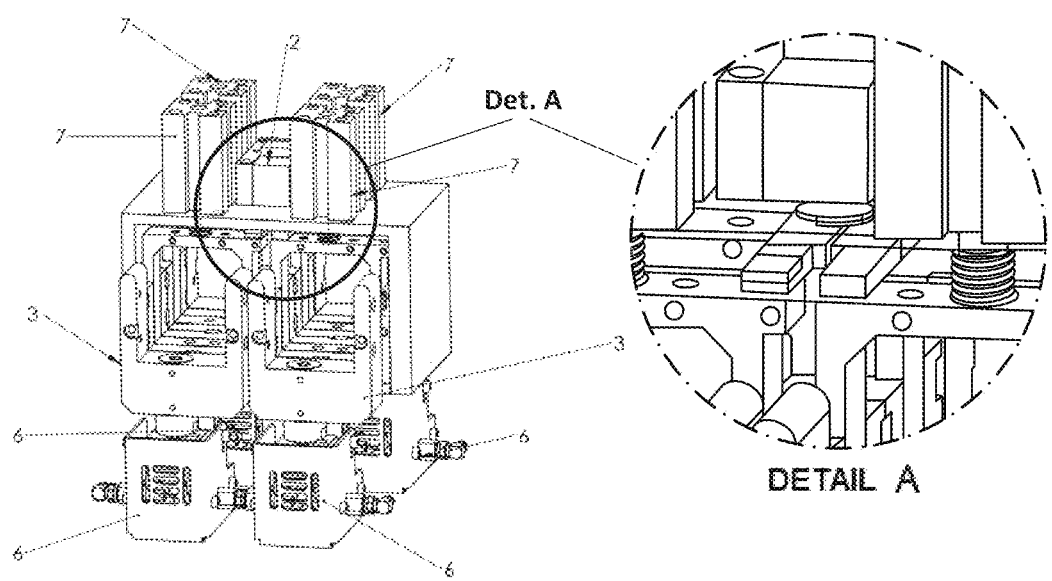

A second variant (FIGS. 4A-4B-4C), relates to the possibility—according to the operating principle of the previous variant—of using two or more extruders which use one and the same touch probe (2). Again, in this case, to carry out the respective calibrations, the movable support (1), the extruder support (3), and the locking mechanism (7) are replicable for each extruder (6) mounted on the carriage (5). Since all the extruders are positioned at a mutually very similar distance from the plane, it is preferable to identify positions in the plane in which one or more blocks calibrated in height, of known and limited dimensions, are provided to be used as a support surface for the tip of each extruder during the calibration, to avoid mechanical interference with the other extruders at the moment of probing. During the step of printing, then, it is possible to lift them alternatively because the touch probe—common to all—must not be in operation.

Finally, it is worth noting that, although reference has been made in the present description to examples in which it is the printing plane to be vertically movable towards the extruder (6), the present invention is applicable, without modifications and with the same functions and advantages, even if the plane is fixed in a vertical direction and the extruder (6) is vertically movable towards the plane itself.

It is also worth noting that said precision linear guides can consist of shoulder screws, or slides, or other guiding systems adapted to the purpose.

It is apparent that many adjustments, adaptations, integrations, variations, and replacements of elements with others which are functionally equivalent can be made to the embodiment and variants thereof described above by way of non-limiting example, without however departing from the scope of protection of the claims of this application.

The invention claimed is:

1. A calibration system for automatically resetting an effective vertical Z coordinate corresponding to a tip of at least one extruder (6) of a printing head with filler material filament for 3D printers provided with a printing plane which is movable along a vertical Z axis, the printing head installed on a carriage (5) for moving the at least one extruder on a horizontal plane XY, comprising:
   at least one touch probe unit associated with and operatively connected to the at least one extruder (6), arranged between said carriage (5) and the at least one extruder (6);
      at least one movable support (1);
      at least one touch probe (2);
      at least one extruder support (3); and
      at least one coupling system (4),
   wherein the at least one movable support (1) is a mechanical spring-operated sliding system, configured to allow the at least one extruder to travel a path required to activate the touch probe (2) during a touching operation and to return to the printing position.

2. The calibration system according to claim 1,
   wherein said movable support (1) is provided with elastic means which cooperate with precision linear guides, and
   wherein the precision linear guides are configured to ensure that a nozzle performs the working travel to activate a touch probe circuit of the touch probe (2) thus allowing the movement only along Z with centesimal accuracy.

3. The calibration system according to claim 1, wherein an element rigidly connected to said movable support (1) is anchored thereto, having position adjustment means to actuate the touch probe without interfering with the carriage (5) or the support (1).

4. The calibration system according to claim 1, wherein said touch probe (2) is of electro-mechanical type, in order to switch the actuating movement into an input for a central control unit, which consists of a micro controller unit (MCU) integrated on a single electronic circuit or a common PLC.

5. The calibration system according to claim 1, wherein the extruder support (3) is made of metal, and is provided with quick coupling-type means (4) for coupling the extruder (6).

6. The calibration system according to claim 5, wherein said quick coupling means (4) of the extruder (6) have a thrust spring (a) and a ball (b), wherein the spring is held under compression by an adjustable knob (c), which is configured to allow changing the elastic force applied by the spring (a) onto the ball (b),
   the body of the extruder (6) being axially insertable into the housing thereof and being provided with an appropriate recess for said ball (b) placed at a fixing segment, while the ball (b) is movable in a transversal direction to the body of the extruder (6), so as to enter partially into said recess to snap-lock the body of the extruder in the axial direction, precisely at the fixing segment.

7. The calibration system according to claim 6, wherein the knob (c) is lockable to inhibit removal of the extruder (6), leaving the extruder free to move in an axial touching direction along the Z axis, the extent of which is at least equal to the working travel for activating the touch probe (2), wherein, for such a purpose, the recess present in the body of the extruder (6) is larger than the ball, at least along the sliding axis of the extruder.

8. The calibration system according to claim 1,
   wherein the carriage (5) is movable along the XY plane of the 3D printer, on which components forming the printing head are installed, and
   wherein the extruder (6) allows the filler material filament to switch from solid to viscoelastic state, thus allowing the deposition of the material in layers.

9. The calibration system according to claim 1,
   wherein the tip of the nozzle of the extruder (6) is arranged to come into physical contact with a printing plane of the 3D printer, to obtain reading/detection of a Z=0 coordinate of the printing plane by actuating the touch probe (2), and
   wherein, in order to detect an actual position of the Z=0 coordinate of the printing plane, the printing plane is liftable until the printing plane comes into physical contact with the tip of the extruder (6), which is movable upwards to actuate the touch probe (2), thus signaling said physical contact to a central control unit.

10. The calibration system according to claim 1, wherein the calibration system is configured to carry out a calibration procedure which, at least in a single calibration point of the plane, is adapted to move the printing plane along the vertical Z axis to make a 0-Plane, which is specific to the calibration point, correspond to 0-Ex and therefore to 0-Abs.

11. The calibration system according to claim 10,
   wherein the touch probe (2), which is mounted to the extruder support (3) integrally therewith, is configured to provide a physical displacement of the extruder (6), by a known distance and indicated by Gap-T, which is sufficient to actuate the touch probe to send a signal to a central control unit, and
   wherein said central control unit is either integrated in the 3D printer or is separate and in constant operative connection therewith.

12. The calibration system according to claim 1, further comprising:
   an additional locking mechanism (7), to lock, during the printing operation, a sliding of the movable support (1)

with respect to the extruder support (3), thus preventing possible undesired/uncontrolled translations of the extruder (6) along the Z axis with respect to the carriage (5) with which the extruder support (3) is integral, such a locking mechanism (7) being configured to be disabled during calibration of the extruder (6).

13. The calibration system according to claim 12, wherein the at least one extruder (6) comprises multiple extruders (6) with respective touch probes (2), and the locking mechanism (7) of an extruder of the multiple extruders (6) to be calibrated is configured to be unlockable, while other extruders of the multiple extruders (6) are temporarily liftable to a Z height which is higher than that for the touching operation.

14. The calibration system according to claim 13, wherein the movable support (1), the extruder support (3) and the locking mechanism (7) are capable of being replicated for each extruder (6) mounted to the carriage (5), one or more height-calibrated blocks of known, limited dimensions being provided, which are usable as a support surface for the tip of each extruder (6) during the respective calibration, so as to avoid mechanical interferences with the other extruders at the time of the touching operation.

15. The calibration system according to claim 2, wherein said elastic means comprises springs.

16. The calibration system according to claim 2, wherein an element rigidly connected to said movable support (1) is anchored thereto, having position adjustment means to actuate the touch probe without interfering with the carriage (5) or the support (1).

17. The calibration system according to claim 5, wherein the extruder support (3) is made of aluminum.

* * * * *